(12) United States Patent
McGill et al.

(10) Patent No.: US 11,529,966 B2
(45) Date of Patent: Dec. 20, 2022

(54) RISK PREDICTION ON A PEER-TO-PEER NETWORK

(71) Applicant: TOYOTA RESEARCH INSTITUTE, INC., Los Altos, CA (US)

(72) Inventors: Stephen G. McGill, Cambridge, MA (US); Guy Rosman, Newton, MA (US); Luke S. Fletcher, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/220,726

(22) Filed: Apr. 1, 2021

(65) Prior Publication Data

US 2021/0300400 A1    Sep. 30, 2021

Related U.S. Application Data

(63) Continuation of application No. 16/830,052, filed on Mar. 25, 2020.

(51) Int. Cl.
*B60W 50/14* (2020.01)
*B60W 40/09* (2012.01)
*B60W 40/04* (2006.01)

(52) U.S. Cl.
CPC ............ *B60W 50/14* (2013.01); *B60W 40/04* (2013.01); *B60W 40/09* (2013.01); *B60W 2050/143* (2013.01); *B60W 2420/42* (2013.01)

(58) Field of Classification Search
None
See application file for complete search history.

(56) References Cited

U.S. PATENT DOCUMENTS 11,008,018 B1    5/2021 McGill et al.

FOREIGN PATENT DOCUMENTS

WO    WO-2017192144 A1 * 11/2017 ............. B60K 35/00

* cited by examiner

*Primary Examiner* — Adolf Dsouza
(74) *Attorney, Agent, or Firm* — Seyfarth Shaw LLP (57) ABSTRACT

A method for controlling a driving behavior performed by a first agent includes navigating, by the first agent, according to a trajectory and a velocity. The method also includes receiving, from a second agent, a risk identification message identifying a third agent as a potential risk based on the third agent performing a behavior associated with a probability that is less than a threshold. The method further includes autonomously engaging a defensive driving mode in response to receiving the risk identification message. The method still further includes adjusting one or both of the trajectory or the velocity in response to autonomously engaging the defensive driving mode.

20 Claims, 7 Drawing Sheets

RISK PREDICTION ON A PEER-TO-PEER NETWORK

CROSS-REFERENCE TO RELATED APPLICATION

The present application claims priority to U.S. patent application Ser. No. 16/830,052, filed on Mar. 25, 2020, and titled "RISK PREDICTION ON A PEER-TO-PEER NETWORK," the disclosure of which is expressly incorporated by reference in its entirety.

BACKGROUND

Field

Certain aspects of the present disclosure generally relate to vehicle warning systems.

Background

A vehicle warning system may warn a driver of a potentially dangerous situation. In response to the warning, the driver may initiate precautionary measures to avoid the potentially dangerous situation. The vehicle warning systems may sense a potentially dangerous situation based on information obtained from one or more vehicle sensors. In some cases, a potentially dangerous situation may not be visible to the vehicle's sensors. It is desirable to improve vehicle warning systems to provide warnings for potentially dangerous situations that are not visible to the vehicle's sensors.

SUMMARY

In one aspect of the present disclosure, a method for warning an agent is disclosed. The method includes determining a probability for each one of a set of potential second behaviors of a first agent based on an observed first behavior of the first agent at a first time period. The method also includes observing a second behavior of the first agent at a second time period. The method further includes determining whether the observed second behavior corresponds to a potential second behavior with a probability that is less than a threshold. The method still further includes transmitting a warning to a second agent when the probability is less than the threshold.

In another aspect of the present disclosure, a non-transitory computer-readable medium with non-transitory program code recorded thereon is disclosed. The program code is for warning an agent. The program code is executed by a processor and includes program code to determine a probability for each one of a set of potential second behaviors of a first agent based on an observed first behavior of the first agent at a first time period. The program code also includes program code to observe a second behavior of the first agent at a second time period. The program code further includes program code to determine whether the observed second behavior corresponds to a potential second behavior with a probability that is less than a threshold. The program code still further includes program code to transmit a warning to a second agent when the probability is less than the threshold.

Another aspect of the present disclosure is directed to an apparatus for warning an agent. The apparatus having a memory and one or more processors coupled to the memory. The processor(s) is configured to determine a probability for each one of a set of potential second behaviors of a first agent based on an observed first behavior of the first agent at a first time period. The processor(s) is also configured to observe a second behavior of the first agent at a second time period. The processor(s) is further configured to determine whether the observed second behavior corresponds to a potential second behavior with a probability that is less than a threshold. The processor(s) still further configured to transmit a warning to a second agent when the probability is less than the threshold.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

A vehicle warning system may warn an agent of a potentially dangerous situation. The potentially dangerous situation may be a situation that can harm the vehicle and/or occupants, such as a road hazard or an erratic agent (e.g., another vehicle or pedestrian). For example, the vehicle warning system may generate a warning when a distance between the vehicle and an object is less than a threshold. A driver and/or autonomous system may take precautionary measures to avoid the potentially dangerous situation. According to aspects of the present disclosure, the agent may operate in a manual mode, an autonomous mode, and/or a semi-autonomous mode.

In the manual mode, a human driver manually operates (e.g., controls) the vehicle. In the autonomous mode, a vehicle control system operates the vehicle without human intervention. In the semi-autonomous mode, the human may operate the vehicle, and the vehicle control system may override or assist the human. For example, the vehicle control system may override the human to prevent a collision or to obey one or more traffic rules.

Vehicle warning systems may sense potentially dangerous situations based on information obtained from one or more vehicle sensors. The sensors may include, for example, a red-green-blue (RGB) camera, a RADAR sensor, and/or a LIDAR sensor. In some cases, the potentially dangerous situation may not be visible to the vehicle's sensors. For example, the vehicles' sensors may not be within visual range of the potentially dangerous situation. As another example, an object on the road may block a view of one or more sensors. It is desirable to improve vehicle warning systems to provide warnings for potentially dangerous situations that are not visible to the vehicle's sensors.

Aspects of the present disclosure are directed to identifying an agent engaging in risky behavior (e.g., a risky agent). Aspects of the present disclosure are also directed to transmitting a warning regarding the risky agent. The warning may warn other agents when the other agents' sensors are not within visual range of the risky agent. In response to the warning, the other agents may initiate defensive measures to reduce the probability of potential harm.

Figure 1:
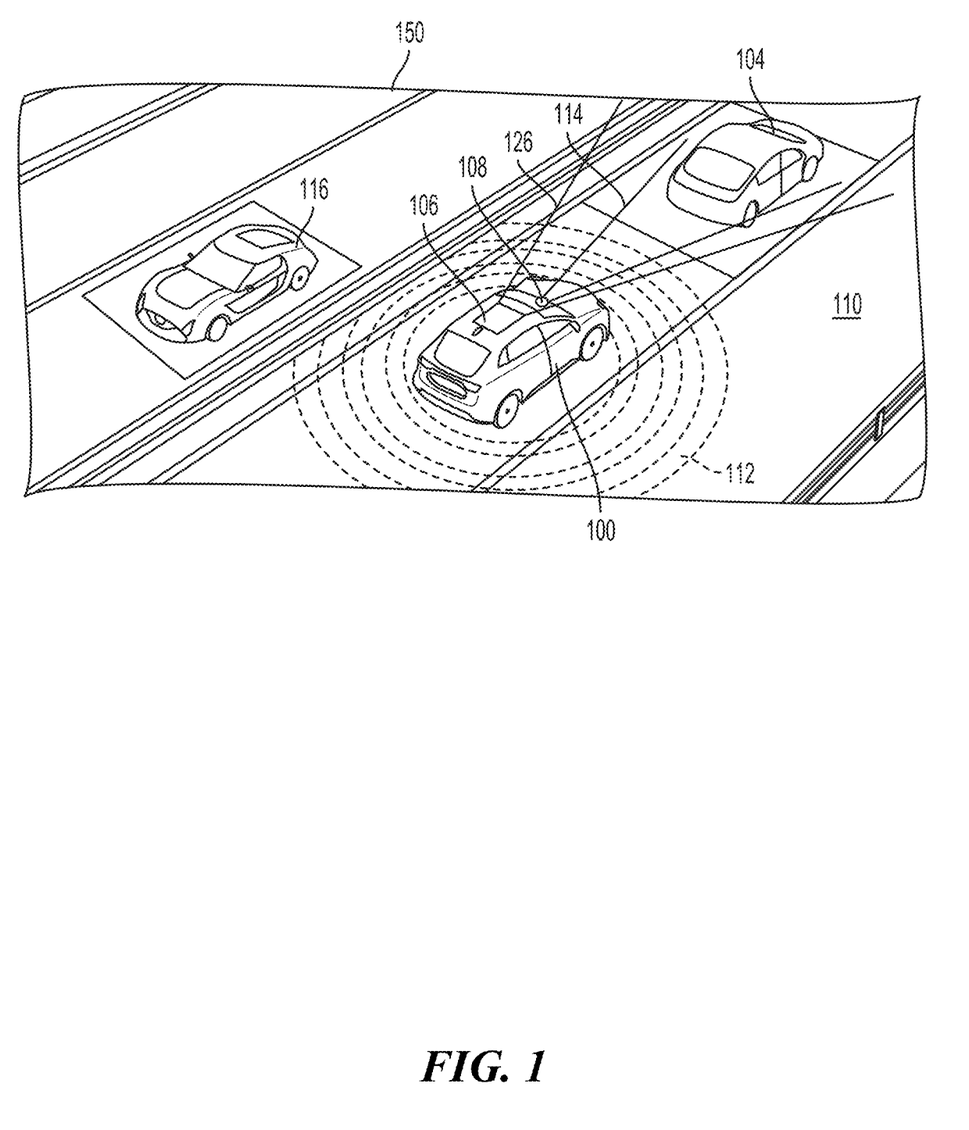
FIG. 1 illustrates an example of a vehicle in an environment according to aspects of the present disclosure.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a LIDAR sensor 106. Other sensors, such as RADAR and/or ultrasound, are also contemplated. Additionally, or alternatively, the ego vehicle 100 may include one or more additional 2D cameras and/or LIDAR sensors. For example, the additional sensors may be side facing and/or rear facing sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, an artificial neural network (e.g., autonomous driving system) of the ego vehicle 100 may extract height and/or depth features from the first output stream. The autonomous driving system of the ego vehicle 100 may also extract height and/or depth features from the second output stream.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may also identify risky agents.

Agents, such as vehicles, pedestrians, and bicyclists, may engage in various types of risky behavior. The risky behavior may include, for example, swerving between lanes or failing to obey traffic laws. An ego agent may observe the agent's behavior via one or more sensors. In response to identifying the risky behavior, the ego agent may engage defensive measures to avoid an incident. For brevity, the agent performing the risky behavior may be referred to as the risky agent.

Other agents in proximity to the risky agent may fail to observe the risky agent. As such, the other agents may not have time to engage defensive measures before the risky agent is within visual range. As discussed, the agent may fail to observe the risky agent due to, for example, sensor occlusion, a distance from the risky agent, and/or other reasons.

In one configuration, an ego agent's warning system identifies a risky agent and transmits a risky behavior warning to other agents. The warning may be targeted to specific agents, such as agents within a specific proximity. As another example, the ego agent may broadcast the warning, such that the warning is not targeted to specific agents. Upon receiving the warning, the other agents may perform defensive actions. The other agents may include, for example, vehicles, pedestrians, and/or bicyclists.

The ego agent identifies an agent performing a risky behavior by observing the agent's behavior. In one configuration, after observing an agent's behavior (e.g., actions) during a time period, the ego agent assigns probabilities to each behavior of a set of possible behaviors at a subsequent time period. The probability is the probability of the agent performing the behavior given the current conditions. The ego agent may determine that the agent's behavior is risky when the probability of the agent's behavior is less than a threshold. This type of behavior may also be referred to as a low probability behavior.

Figure 2A:
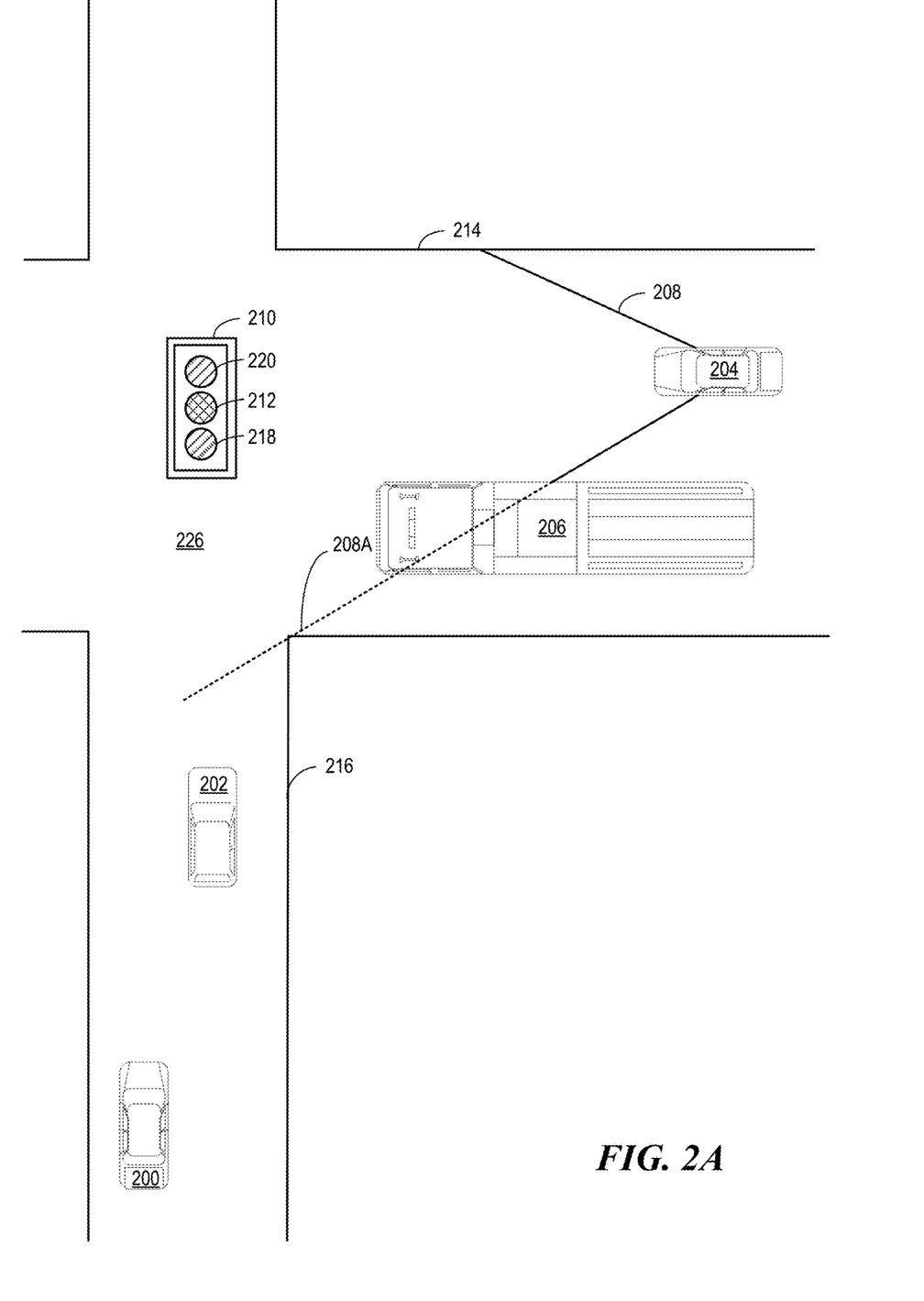
FIGS. 2A, 2B, and 2C illustrate examples of identifying risky behavior according to aspects of the present disclosure.

FIG. 2A illustrates an example of observing an agent's behavior according to aspects of the present disclosure. As shown in FIG. 2A, sensors (not shown) of an ego agent 200 observe a first agent 202 traveling on a first road 216. The sensor data may reflect a position and a velocity of the first agent 202. As such, the ego agent's 200 warning system determines that the first agent 202 is traveling towards an intersection 226. Based on the sensor data, the warning system may also determine that a traffic light 210 at the intersection 226 has switched from a green light 218 to a yellow light 212.

The warning system may be an artificial neural network that has been trained to determine road conditions and agent information. Road conditions may include traffic conditions, traffic signal status (e.g., red, yellow, green), posted speed limits, and/or other information. Agent information may include an agent's position, velocity, direction of travel, and/or other information. The warning system may also receive environmental information, such as speed limits, road layout information, weather, and/or other information, from a remote device (e.g., cloud-based server).

In the example of FIG. 2A, a second agent 204 is traveling towards the intersection 210 on a second road 214 adjacent to the first road 216. In this example, a portion 208A of the second agent's 204 sensor field of view 208 is blocked by a third agent 206. In one configuration, the second agent 204 broadcasts a message notifying one or more agents 200, 202, 206 of the partially blocked view. The message may be transmitted via a vehicle to vehicle (V2V) network (e.g., peer-to-peer network). Additionally, or alternatively, the message may be transmitted via an infrastructure network (e.g., wireless communication network), a vehicle to everything (V2X) network, a vehicle to infrastructure (V2I) network, a vehicle to network (V2N) network, a vehicle to pedestrian (V2P) network, and/or another type of network.

Figure 2B:
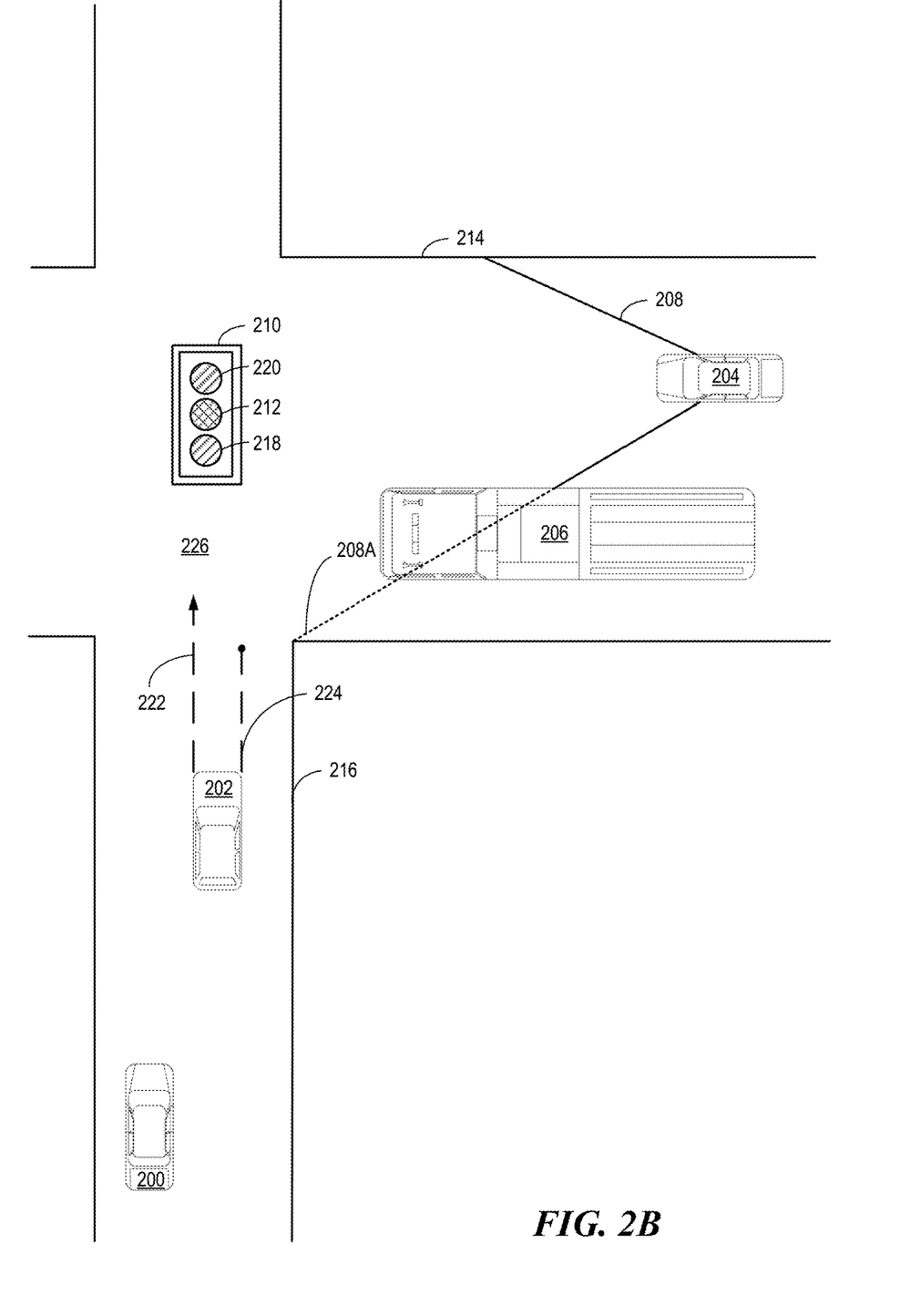

After observing the first agent's 202 behavior (e.g., position, velocity, direction of travel, etc.), the ego agent 200 determines probabilities for each behavior of a set of potential behaviors for a subsequent time period (e.g., future behaviors). FIG. 2B illustrates an example of determining probabilities for each behavior of a set of possible future behaviors according to aspects of the present disclosure. In this example, the ego agent's 200 warning system determines a set of potential future behaviors based on the first agent's 202 current behavior (e.g., traveling towards the intersection 226).

As shown in FIG. 2B, the set of potential future behaviors include, for example, proceeding through the intersection 222 before or after the traffic light 210 turns to red 220, and stopping at the intersection 224. For brevity, in the current example, the set of potential future behaviors is limited to the aforementioned behaviors. Other potential future behaviors are possible.

The ego agent's 200 warning system assigns a probability to each potential future behavior 222, 224. For example, the ego agent's 200 warning system assigns a high probability value to the potential behavior of stopping at the intersection 224. The high probability value refers to a value that is greater than or equal to a first threshold. In this example, the ego agent's 200 warning system assigns a low probability to the potential behavior of proceeding through the intersection 222. The low probability value refers to a value that is less than or equal to a second threshold.

The probabilities may be assigned based on training. For example, the warning system may be trained on behavior data of various agents. The training may be updated as the warning system observes real-world behaviors. The behavior data may include high probability behaviors and low probability behaviors. High probability behaviors generally relate to behaviors in accordance with traffic regulations, such as, driving on a correct side of a road and following a posted speed limit. Low probability behaviors generally relate to behaviors that are not in accordance with traffic regulations, such as, driving on a wrong side of a road, exceeding a posted speed limit, and swerving between lanes.

Figure 2C:
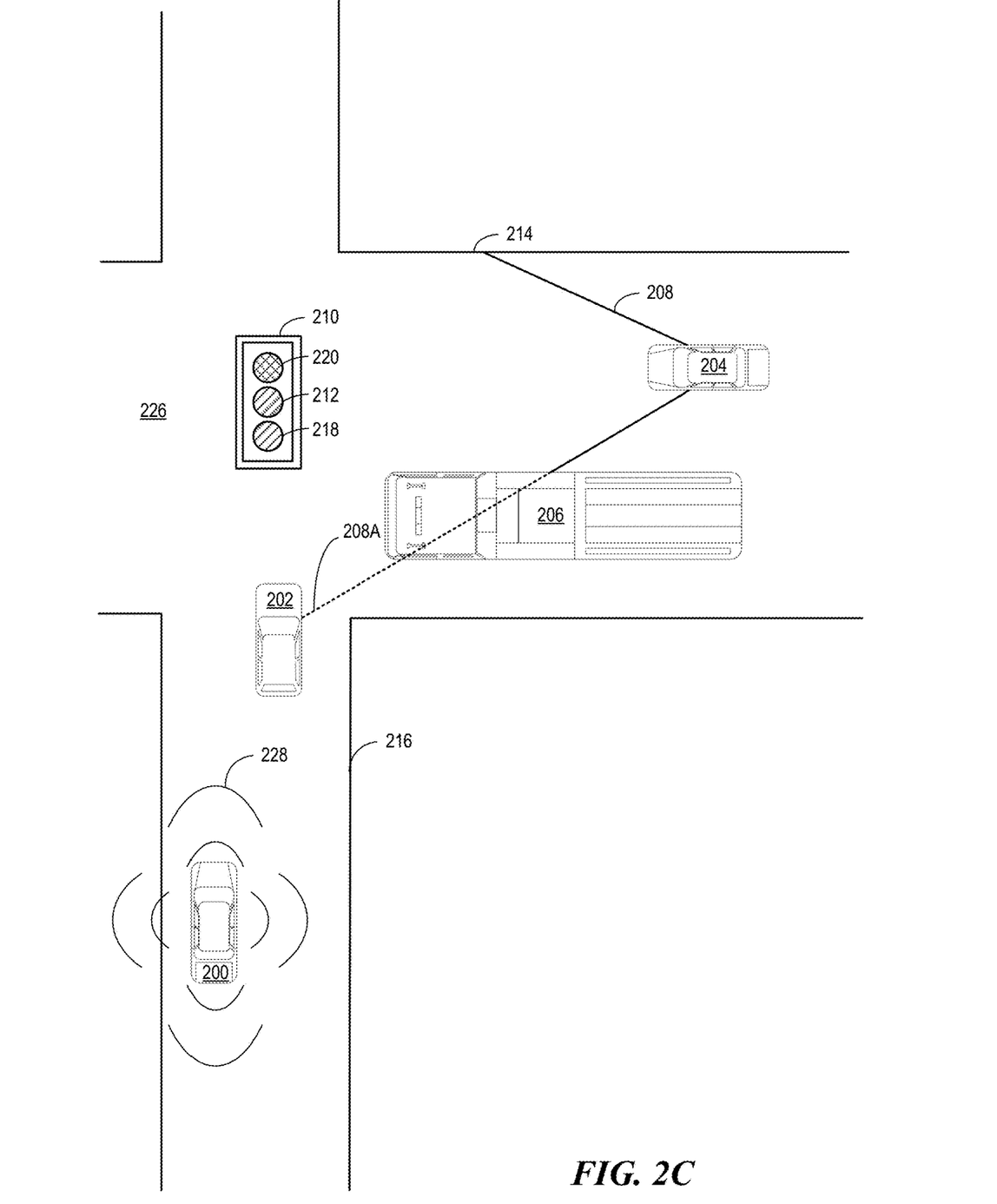

After determining the probabilities of the first agent's 202 potential future behaviors 222, 224, the ego agent 200 continues to monitor the first agent's 202 behavior. In one configuration, the warning system transmits a warning if the first agent 202 performs a low probability behavior. FIG. 2C illustrates an example of transmitting a warning 228 according to aspects of the present disclosure.

As shown in FIG. 2C, the first agent 202 has entered the intersection 226 after the traffic light 210 turns red 220. In response, the ego agent's 200 warning system determines that the first agent 202 has engaged in a low probability behavior. As discussed, the low probability behavior may be classified as risky behavior. Therefore, the warning system transmits a warning 228 to other agents 204, 206. In the present example, the first agent 202 is still not visible to the second agent 204 because the third agent 206 is blocking a portion 208A of the second agent's 204 field of view 208.

The warning 228 may be broadcast to all agents 204, 206 within range of the ego agent 200. Additionally, or alternatively, the warning 228 may be specifically transmitted to one or more agents. For example, the warning 228 may only be transmitted to the second agent 204 based on the second agent's 204 message indicating the occluded field of view 208. The warning 228 may be transmitted via a V2V network. Additionally, or alternatively, the message may be transmitted via an infrastructure network, a V2X, a V2I network, a V2N network, a V2P, and/or another type of network.

The driver of the second agent 204 may be notified of the warning 228 via an in-cabin output, such as an audio message or a message displayed on a user interface. As an example, the message is displayed on a heads-up display or a head unit of the second agent 204. In addition to notifying the driver of the risky behavior, the message may include one or more of a make, model, vehicle class, or color of the first agent 202, and a description of the risky behavior.

An autonomous or semi-autonomous driving system of the second agent may also process the warning 228. The second agent's 204 driving system and/or driver may initiate a defensive driving mode in response to the warning 228. For example, the second agent's 204 driving system and/or driver may change velocity and/or trajectory (e.g., slow down or stop before entering the intersection 226). Additionally, the ego agent's 200 driving system and/or driver may initiate a defensive driving mode in response to identification of the risky behavior.

In one configuration, the warning 228 is also transmitted to the first agent 202 (e.g., the agent that is performing the risky behavior). In response to receiving the warning 228, the first agent's 202 driving system and/or driver may stop engaging in the risky behavior. Additionally, or alternatively, the first agent's 202 driving system and/or driver may initiate a defensive driving mode to reduce a probability of a potentially dangerous situation.

According to aspects of the present disclosure, if a vehicle is operating in a manual mode, an autonomous or semi-autonomous driving mode may be initiated in response to the warning 228. The autonomous or semi-autonomous driving mode may overtake the manual operation or assist the manual operation in averting a potentially dangerous situation, such as a collision.

In one configuration, the ego agent predicts a risky behavior before observing the agent engaging in the risky behavior. For example, based on the sensor data, the ego agent may predict that the agent will engage in the low probability behavior (e.g., risky behavior). The ego agent may transmit the warning based on the predicted risky behavior.

For example, based on the example of FIG. 2C, the ego agent 200 may determine that the first agent 202 is traveling at 60 miles per hour. The ego agent 200 determines the distance for a complete stop given the first agent's 202 velocity. The distance may be an average distance or based on data obtained for the first agent's 202 make and model. From the sensor data, the ego agent 200 may determine that a distance between the first agent 202 and the intersection 226 is less than the determined stopping distance. Accordingly, the ego agent 200 may predict that the first agent 202 cannot, or will not, stop before entering the intersection 226.

In one configuration, the ego agent uses lane geometry for risk estimation. The lane geometry refers to estimating a correct direction of travel for agents in a given lane. Based on the estimated direction of travel, the ego agent predicts whether a given agent is traveling in a correct direction for a given lane.

The lane geometry may be the geometry of the road on which the ego agent is traveling. As an example, the ego agent observes an agent traveling in a lane. Risky behavior may be predicted if the agent is traveling in a direction that is opposite to the direction used to estimate the lane geometry.

As discussed, agents in an environment may transmit and/or receive messages via a V2V network, an infrastructure network, a V2X network, a V2I network, a V2N network, a V2P network, and/or another type of network. V2N and V2V networks may connect agents to cloud services and wireless infrastructure (e.g., LTE, 5G, etc.). For example, real-time information about traffic, routes, and/or road situations may be communicated over the V2N and V2V networks. The agents may also transmit information agent-centric information, such as, an agent's location, direction, speed, braking status, and/or steering wheel position.

In a V2I network, agents may communicate with road infrastructure, such as traffic signals. V2I sensors collect information about traffic, traffic light states, radar devices, cameras, and other road signals. Nodes in a V2I network may work together to improve throughput. In a V2P network, agents may communicate with pedestrians. For example, a vehicle may transmit a message to a pedestrian's mobile device. In a V2X network, the agent may collect and share information with any other node (e.g., network, person, infrastructure) in the environment. That is, V2X networks may be a combination of all other types of agent communication.

Figure 3:
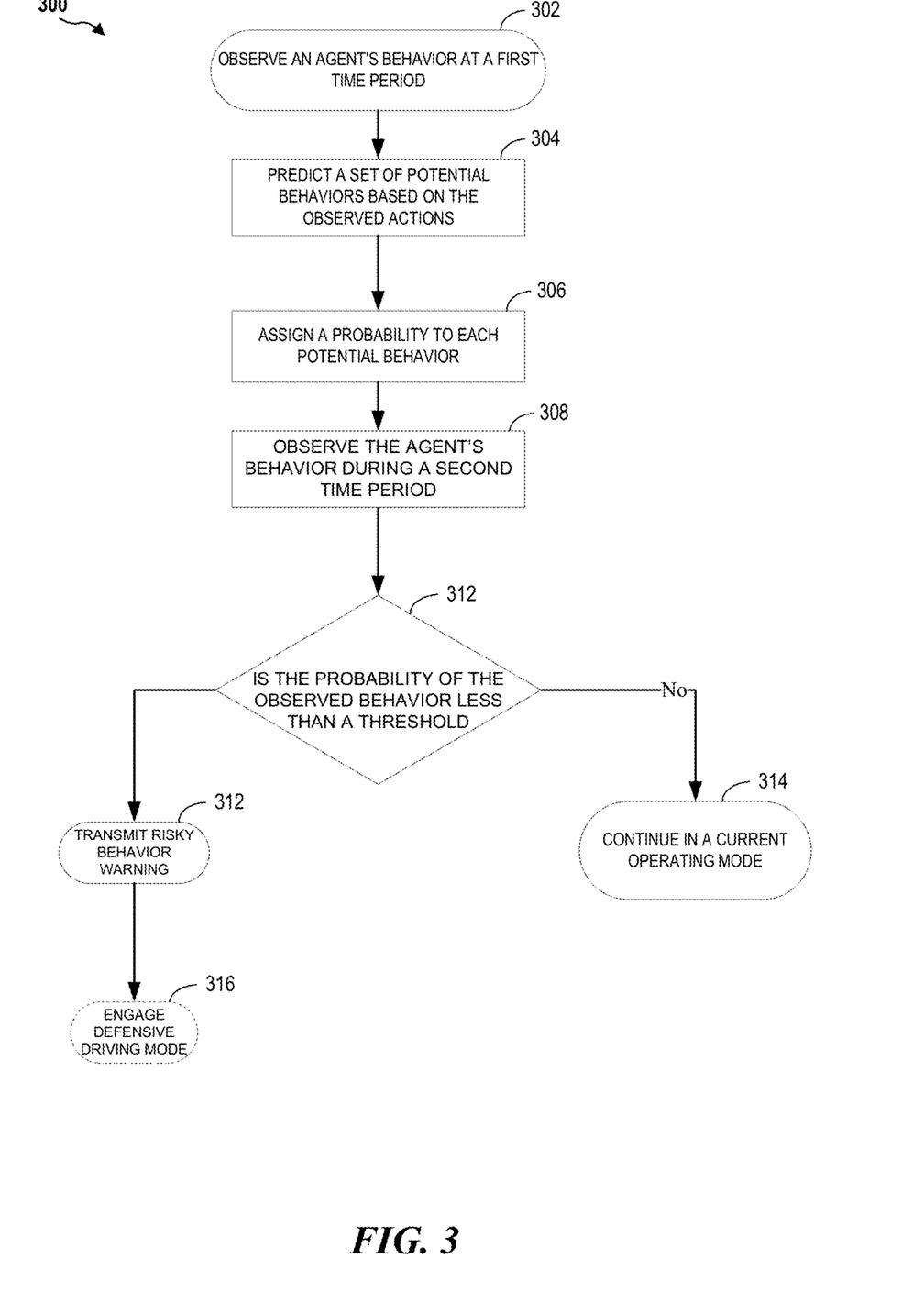
FIG. 3 illustrates a flow diagram for a warning system according to aspects of the present disclosure.

FIG. 3 illustrates a flow diagram 300 for transmitting a risky behavior warning according to aspects of the present disclosure. As shown in FIG. 3, at block 302, an ego agent observes an agent's behavior (e.g., action) during a first time period. An agent may be a vehicle, pedestrian, bicyclist, or another type of mechanized equipment (e.g., an electric scooter) in an environment.

The agent's behavior may be observed via one or more sensors of the ego agent. That is, an ego agent's warning system receives and interprets sensor data. The warning system may be an artificial neural network. Additionally, or alternatively, the ego agent may receive information regarding the agent's behavior from one or more infrastructure sensors, such as a camera on a traffic signal.

At block 304, the ego agent predicts a set of potential future behaviors for the agent based on the observed actions. The set of potential future behaviors are potential behaviors that may occur at a second time period that is after the first time period. The potential future behaviors may be predicted based on training data provided to the warning system.

As an example, the ego agent may observe an agent enabling a left turn signal and entering a left turn lane before an intersection. Based on the observations, the ego agent predicts that the agent will turn left at the intersection. The ego agent may also predict other potential behaviors for the agent, such as swerving right or continuing straight through the intersection.

At block 306, the ego agent assigns a probability to each potential behavior. The warning system may be trained to determine the probabilities from the behavior data. The probabilities may be assigned based on training on behavior data. The behaviors may be categorized as high probability behaviors and low probability behaviors. Other behavior categories, such as medium probability, may also be used. In the previous example, the potential behavior of turning left at the intersection is a high probability behavior. Additionally, the potential behaviors of swerving right and continuing straight through the intersection are low probability behaviors.

A high probability behavior refers to behavior with a probability value that is greater than or equal to a high probability threshold. A low probability behavior refers to behavior with a probability value that is less than or equal to a low probability threshold. The thresholds may be pre-set by a user or a manufacturer. Additionally, or alternatively, the thresholds may be dynamically adjusted based on driving conditions, environment, user preference, and/or other factors.

At block 308, the ego agent observes the agent's behavior at a second time period. Based on the observations at the second time period, at block 312, the ego agent determines if the probability assigned to the observed behavior is less than a low probability threshold. That is, the ego agent determines whether the agent is engaged in a low probability behavior (e.g., risky behavior).

As discussed, the ego agent may predict a risky behavior before observing the agent engaging in the risky behavior. For example, based on the sensor data at the second time period, the ego agent may predict that the agent has an increased potential of performing the low probability behavior (e.g., risky behavior). Thus, based on the sensor data, the ego agent may observe the agent performing the risky behavior or predict an occurrence of the risky behavior.

If the agent is engaged in a low probability behavior, at block 314, the ego agent warns agents of the risky behavior. The warning may be transmitted and/or received via one or more networks. The warning may be broadcast to agents within a certain range of the ego agent or targeted to one or more agents. The agent performing the risky behavior may receive the warning from the ego agent. An agent's driving system and/or driver may engage a defensive driving mode in response to receiving the warning.

In an optional configuration, at block 318, the ego agent's driving system engages the defensive driving mode in response to transmitting the warning. If the agent is not engaged in a low probability behavior, at block 316, the ego agent's driving system continues operating in a current operating mode. As discussed, the agent may operate in a manual mode, an autonomous mode, and/or a semi-autonomous mode.

Figure 4:
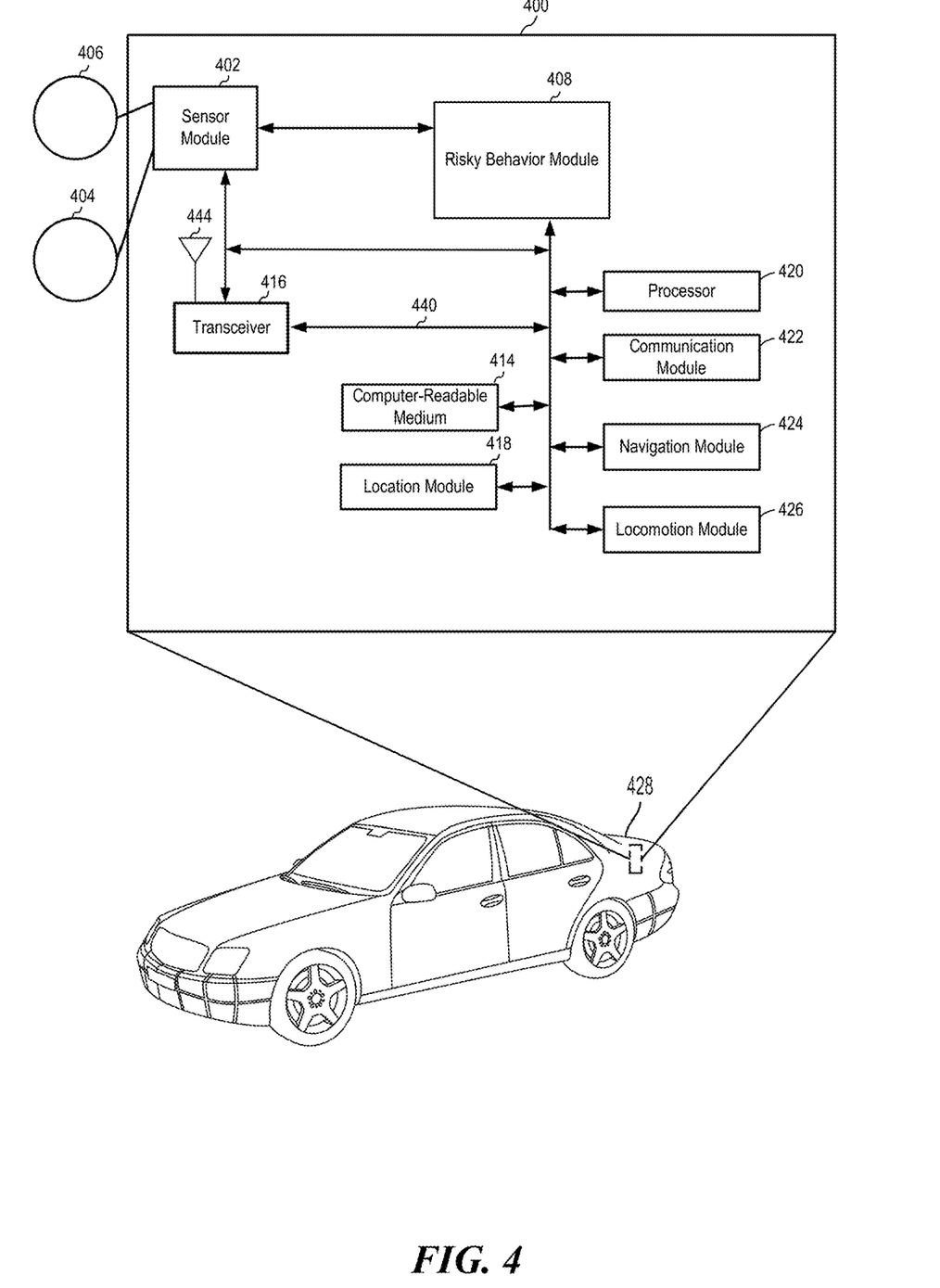
FIG. 4 is a diagram illustrating an example of a hardware implementation for a warning system according to aspects of the present disclosure.

FIG. 4 is a diagram illustrating an example of a hardware implementation for a warning system 400, according to aspects of the present disclosure. The warning system 400 may be a component of a vehicle, a robotic device, or another device. For example, as shown in FIG. 4, the warning system 400 is a component of a vehicle 428. Aspects of the present disclosure are not limited to the warning system 400 being a component of the vehicle 428, as other types of agents, such as a bus, boat, drone, or robot, are also contemplated for using the warning system 400.

The vehicle 428 may operate in one or more of an autonomous operating mode, a semi-autonomous operating mode, and a manual operating mode. Furthermore, the vehicle 428 may be an electric vehicle, a hybrid vehicle, a fuel vehicle, or another type of vehicle.

The warning system 400 may be implemented with a bus architecture, represented generally by a bus 440. The bus 440 may include any number of interconnecting buses and bridges depending on the specific application of the warning system 400 and the overall design constraints. The bus 440 links together various circuits including one or more processors and/or hardware modules, represented by a processor 420, a communication module 422, a location module 418, a sensor module 402, a locomotion module 426, a navigation module 424, and a computer-readable medium 414. The bus 440 may also link various other circuits such as timing sources, peripherals, voltage regulators, and power management circuits, which are well known in the art, and therefore, will not be described any further.

The warning system 400 includes a transceiver 416 coupled to the processor 420, the sensor module 402, a risky behavior module 408, the communication module 422, the location module 418, the locomotion module 426, the navigation module 424, and the computer-readable medium 414. The transceiver 416 is coupled to an antenna 444. The transceiver 416 communicates with various other devices over one or more communication networks, such as an infrastructure network, a V2V network, a V2I network, a V2X network, a V2P network, or another type of network. As an example, the transceiver 416 may transmit a warning to other agents when the risky behavior module 408 identifies a risky agent.

The warning system 400 includes the processor 420 coupled to the computer-readable medium 414. The processor 420 performs processing, including the execution of software stored on the computer-readable medium 414 providing functionality according to the disclosure. The software, when executed by the processor 420, causes the warning system 400 to perform the various functions described for a particular device, such as the vehicle 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 406.

The measurements of the first sensor 406 and the second sensor 404 may be processed by one or more of the processor 420, the sensor module 402, the risky behavior module 408, the communication module 422, the location module 418, the locomotion module 426, the navigation module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the warning system 400.

The locomotion module 426 may be used to facilitate locomotion of the vehicle 428. As an example, the locomotion module 426 may control a movement of the wheels. As another example, the locomotion module 426 may be in communication with one or more power sources of the vehicle 428, such as a motor and/or batteries. Of course, aspects of the present disclosure are not limited to providing locomotion via wheels and are contemplated for other types of components for providing locomotion, such as propellers, treads, fins, and/or jet engines.

The warning system 400 also includes the navigation module 424 for planning a route or controlling the locomotion of the vehicle 428, via the locomotion module 426. In one configuration, the navigation module 424 engages a defensive driving mode when the risky behavior module 408 identifies a risky agent. The navigation module 424 may override user input when the user input is expected (e.g., predicted) to cause a collision. The modules may be software modules running in the processor 420, resident/stored in the computer-readable medium 414, one or more hardware modules coupled to the processor 420, or some combination thereof.

The risky behavior module 408 may be in communication with the sensor module 402, the transceiver 416, the processor 420, the communication module 422, the location module 418, the locomotion module 426, the navigation module 424, and the computer-readable medium 414. In one configuration, the risky behavior module 408 receives sensor data from the sensor module 402. The sensor module 402 may receive the sensor data from the first sensor 406 and the second sensor 404. According to aspects of the present disclosure, the sensor module 402 may filter the data to remove noise, encode the data, decode the data, merge the data, extract frames, or perform other functions. In an alternate configuration, the risky behavior module 408 may receive sensor data directly from the first sensor 406 and the second sensor 404.

In one configuration, the risky behavior module 408 determines a probability for each one of a set of potential second behaviors of a first agent based on an observed first behavior of the first agent at a first time period. The first behaviors may be observed via the first sensor 406 and/or the second sensor 404. The potential second behaviors may be determined (e.g., predicted) based on the sensor data. The first sensor 406 and/or the second sensor 404 may also be used by the risky behavior module 408 to observe a second behavior of the first agent at a second time period.

Figure 5:
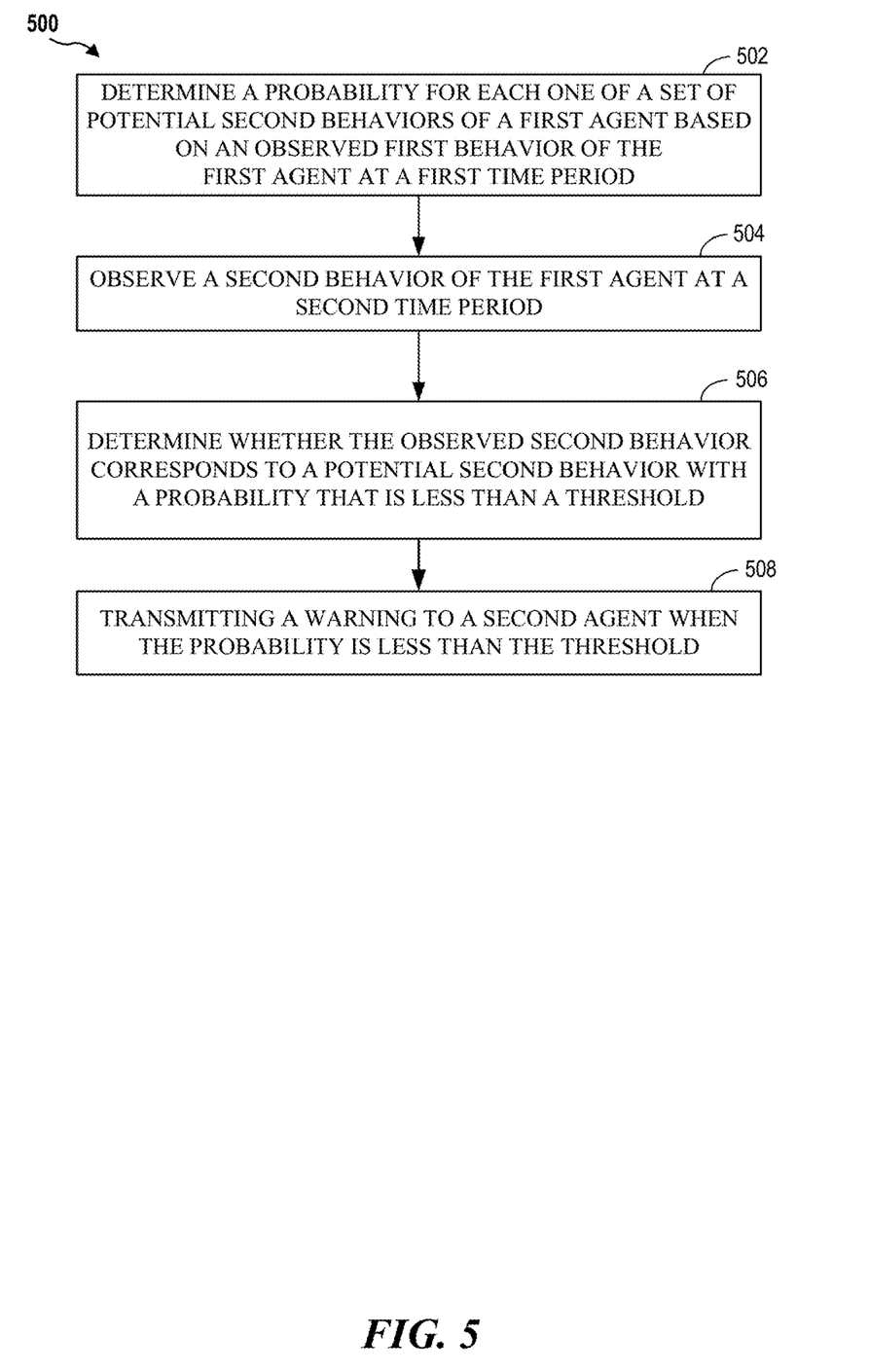
FIG. 5 illustrates a flow diagram for a method of transmitting a warning according to aspects of the present disclosure.

The risky behavior module 408 may determine whether the observed second behavior corresponds to a potential second behavior with a probability that is less than a threshold. Additionally, the risky behavior module 408 may use the transceiver 416 and/or the communication module 422 to transmit a warning to a second agent when the probability is less than the threshold FIG. 5 illustrates a flow diagram 500 for transmitting a warning according to aspects of the present disclosure. As shown in FIG. 5, at block 502, an ego agent determines a probability for each one of a set of potential second behaviors of a first agent based on an observed first behavior of the first agent at a first time period. At block 504, the ego agent observes a second behavior of the first agent at a second time period. the first behavior and second behavior may be observed via a red-green-blue camera, a RADAR sensor, and/or a LiDAR sensor. Other types of sensors are also contemplated.

At block 506, the ego agent determines whether the observed second behavior corresponds to a potential second behavior with a probability that is less than a threshold. The probability may be based on the observed first behavior, environmental conditions, driving regulations, and/or lane geometry. Additionally, at block 508, the ego agent transmits a warning to a second agent when the probability is less than the threshold. The warning may be transmitted via a vehicle-to-vehicle network, a vehicle-to-everything network, a vehicle-to-infrastructure network, a vehicle-to-network network, and/or a vehicle-to-pedestrian network. Other types of networks are also contemplated.

In one configuration, the ego agent engages a defensive driving mode when the probability is less than the threshold. Additionally, or alternatively, the second agent engages a defensive driving mode when the probability is less than the threshold. In one configuration, the first agent is out of range of a sensor of the second agent.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling a driving behavior performed by a first agent, comprising:
   navigating, by the first agent, through an environment according to a trajectory and a velocity;
   receiving, from a second agent, a risk identification message indicating a third agent is a potential risk based on the second agent determining the third agent performed behavior at a first time period, the risk identification message being associated with a probability of an observed behavior at a second time period that is after the first time period, the probability being less than a threshold;
   autonomously engaging a defensive driving mode in response to receiving the risk identification message; and
   adjusting one or both of the trajectory or the velocity in response to autonomously engaging the defensive driving mode.

2. The method of claim 1, further comprising receiving the risk identification message via at least one of a vehicle-to-vehicle network, a vehicle-to-everything network, a vehicle-to-infrastructure network, a vehicle-to-network network, a vehicle-to-pedestrian network, or a combination thereof.

3. The method of claim 1, further comprising:
   determining at least a portion of a field of view of a sensor of the first agent is blocked; and
   transmitting, to the second agent, an occluded view message indicating the first agent's field of view is blocked in response to determining at least the portion of the field of view is blocked.

4. The method of claim 3, wherein the risk identification message is received based on transmitting the occluded view message.

5. The method of claim 3, wherein the sensor comprises a red-green-blue camera, a RADAR sensor, or a LiDAR sensor.

6. The method of claim 3, wherein the sensor fails to identify the third agent prior to the first agent receiving the risk identification message.

7. The method of claim 1, wherein the probability is based on at least one of environmental conditions, driving regulation, lane geometry, or a combination thereof.

8. An apparatus for controlling a driving behavior of a first agent, comprising:
   a processor;
   a memory coupled with the processor; and
   instructions stored in the memory and operable, when executed by the processor, to cause the apparatus to:
   navigate according to a trajectory and a velocity;
   receive, from a second agent, a risk identification message indicating a third agent is a potential risk based on the second agent determining the third agent performed a behavior at a first time period, the risk identification message being associated with a probability of an observed behavior at a second time period that is after the first time period, the probability being less than a threshold;
   autonomously engage a defensive driving mode in response to the received risk identification message; and adjust one or both of the trajectory or the velocity in response to the autonomously engaged the defensive driving mode.

9. The apparatus of claim 8, wherein execution of the instructions further cause the apparatus to receive the risk identification message via at least one of a vehicle-to-vehicle network, a vehicle-to-everything network, a vehicle-to-infrastructure network, a vehicle-to- network network, a vehicle-to-pedestrian network, or a combination thereof.

10. The apparatus of claim 8, wherein execution of the instructions further cause the apparatus to:
   determine at least a portion of a field of view of a sensor of the first agent is blocked; and
   transmit, to the second agent, an occluded view message indicating the first agent's field of view is blocked in response in response to determining at least the portion of the field of view is blocked.

11. The apparatus of claim 10, wherein the risk identification message is received based on transmitting the occluded view message.

12. The apparatus of claim 10, wherein the sensor comprises a red-green-blue camera, a RADAR sensor, or a LiDAR sensor.

13. The apparatus of claim 10, wherein the sensor fails to identify the third agent prior to the first agent receiving the risk identification message.

14. The apparatus of claim 8, wherein the probability is based on and at least one of environmental conditions, driving regulation, lane geometry, or a combination thereof.

15. A non-transitory computer-readable medium having program code recorded thereon for controlling a driving behavior of a first agent, the program code executed by a processor and comprising:
   program code to navigate according to a trajectory and a velocity;
   program code to receive, from a second agent, a risk identification message indicating a third agent is a potential risk based on the second agent determining the third agent performed a behavior at a first time period, the risk identification message being associated with a probability of an observed behavior at a second time period that is after the first time period, the probability being less than a threshold;
   program code to autonomously engage a defensive driving mode in response to the received risk identification message; and
   program code to adjust one or both of the trajectory or the velocity in response to the autonomously engaged the defensive driving mode.

16. The non-transitory computer-readable medium of claim 15, wherein the program code further comprises program code to receive the risk identification message via at least one of a vehicle-to-vehicle network, a vehicle-to-everything network, a vehicle-to-infrastructure network, a vehicle-to-network network, a vehicle-to-pedestrian network, or a combination thereof.

17. The non-transitory computer-readable medium of claim 15, wherein the program code further comprises:
   program code to determine at least a portion of a field of view of a sensor of the first agent is blocked; and
   program code to transmit, to the second agent, an occluded view message indicating the first agent's field of view is blocked in response in response to determining at least the portion of the field of view is blocked.

18. The non-transitory computer-readable medium of claim 17, wherein the risk identification message is received based on transmitting the occluded view message.

19. The non-transitory computer-readable medium of claim 17, wherein the sensor comprises a red-green-blue camera, a RADAR sensor, or a LiDAR sensor.

20. The non-transitory computer-readable medium of claim 17, wherein the sensor fails to identify the third agent prior to the first agent receiving the risk identification message.

\* \* \* \* \*